(12) United States Patent
Davis, Jr. et al.

(10) Patent No.: US 7,116,559 B2
(45) Date of Patent: Oct. 3, 2006

(54) SNAP-IN CLUSTER ATTACHMENT

(75) Inventors: Joseph J Davis, Jr., Ortonville, MI (US); Aaron M Delong, Orion, MI (US)

(73) Assignee: Lear Corporation, Southfield, MI (US)

( * ) Notice: Subject to any disclaimer, the term of this patent is extended or adjusted under 35 U.S.C. 154(b) by 385 days.

(21) Appl. No.: 10/605,383

(22) Filed: Sep. 26, 2003

(65) Prior Publication Data
US 2005/0068747 A1   Mar. 31, 2005

(51) Int. Cl.
H05K 1/14 (2006.01)
(52) U.S. Cl. ...................................... 361/740
(58) Field of Classification Search ............... 361/740; 174/51
See application file for complete search history.

(56) References Cited

U.S. PATENT DOCUMENTS

| | | | |
|---|---|---|---|
| 3,126,120 A * | 3/1964 | Crate | 220/844 |
| 5,311,643 A * | 5/1994 | Marquardt et al. | 16/267 |
| 5,788,532 A | 8/1998 | Takiguchi et al. | |
| 5,910,029 A * | 6/1999 | Siedlik et al. | 439/522 |
| 5,959,844 A | 9/1999 | Simon et al. | 361/759 |
| 5,997,161 A | 12/1999 | Stringfellow et al. | 362/489 |
| 6,227,500 B1 * | 5/2001 | Inaba et al. | 248/27.1 |
| 6,517,145 B1 * | 2/2003 | Hedderly | 296/192 |
| 2003/0079316 A1 | 5/2003 | Ogawa | 24/297 |

FOREIGN PATENT DOCUMENTS

| | | |
|---|---|---|
| DE | 196 17 494 A1 | 11/1997 |
| DE | 697 02 017 T2 | 5/2000 |
| DE | 102 12 944 A1 | 10/2002 |
| FR | 2538053 A1 | 6/1984 |
| GB | 1255791 A | 12/1971 |
| JP | 07277033 A | 10/1995 |

* cited by examiner

Primary Examiner—Kamand Cuneo
Assistant Examiner—Ivan Carpio
(74) Attorney, Agent, or Firm—Bruce E Harang

(57) ABSTRACT

Disclosed is a device and method of attaching a housing unit, particularly an instrument cluster housing, to an IP retainer without the necessity of attaching the bottom edge of said housing with fasteners such as screws and the incumbent requirement for fastener driver and driver operator access. This achieved by providing at least one snap-in attachment member on the bottom edge of the housing. The attachment member terminating in a mounting pin mounted in corresponding pin mounts provided in the receiving IP retainer.

18 Claims, 1 Drawing Sheet

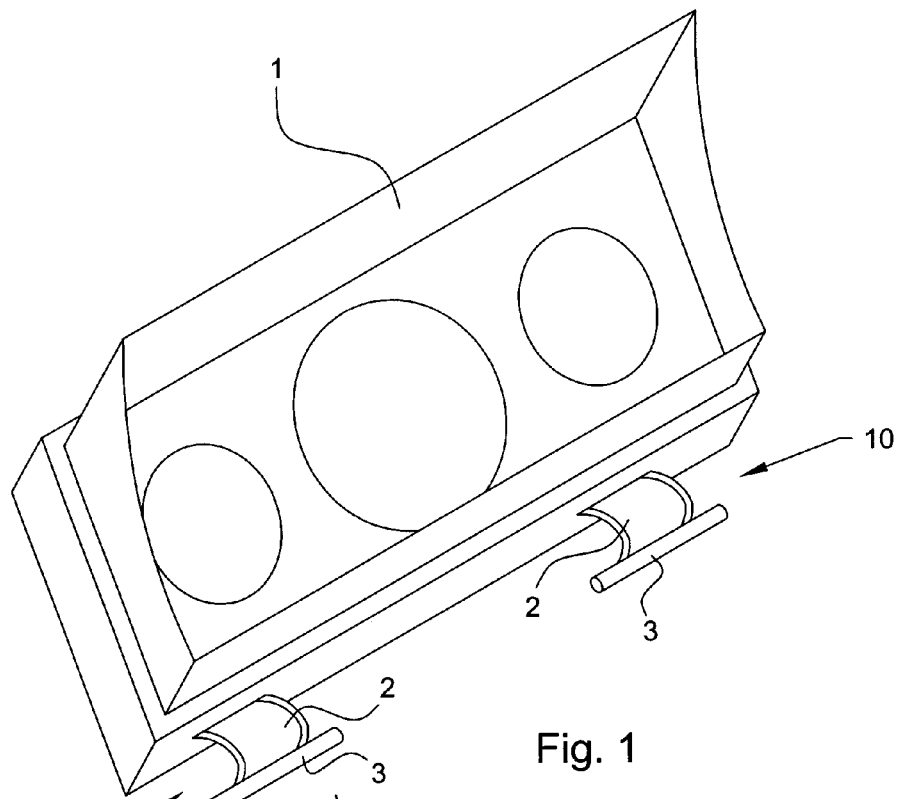
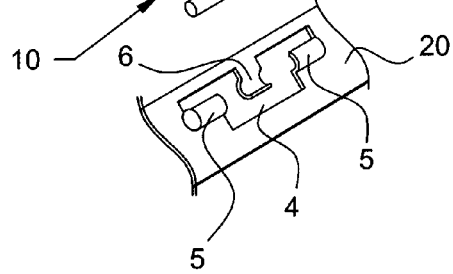
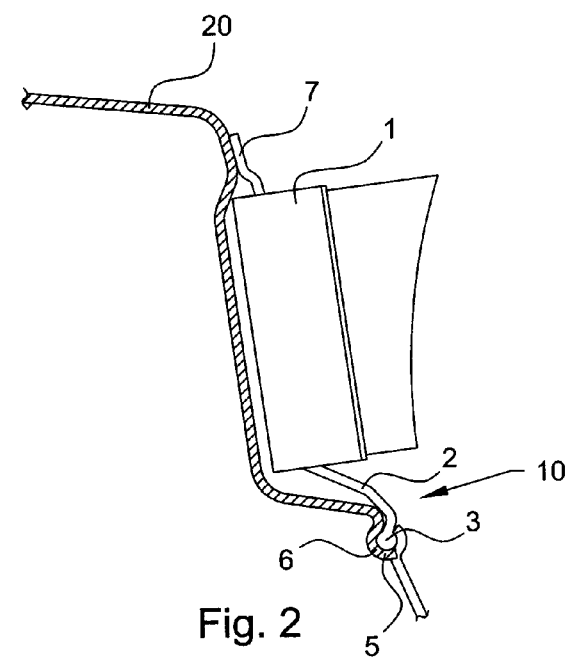
Fig. 1
Fig. 2

SNAP-IN CLUSTER ATTACHMENT

BACKGROUND OF INVENTION

1. Field of the Invention

The present invention generally relates to mounting a cluster housing in a vehicle and particularly to mounting a cluster housing to an IP retainer using a novel snap-in cluster housing attachment assembly. The novel snap-in cluster housing attachment also allows for the cluster housing to be snapped into place and rolled up and fixedly attached to the IP retainer.

2. Description of the Related Art

It is well known in the art to provide for mounting instrument clusters and glove boxes on an IP retainer in a vehicle dashboard assembly. Generally a cluster housing is mounted to an IP retainer after the IP retainer has been incorporated into the dashboard assembly and the dashboard assembly has been mounted in a vehicle. The cluster housing is then typically mounted by manually fastening the cluster housing to the IP retainer on the top and bottom edges of the cluster housing by means of screws or rivets or the like. In order to accomplish this there must be clearance around the cluster housing area of the dashboard large enough to allow access to the mounting areas by both the appropriate tool and the operator's hands. In the current style of vehicle dashboards that wrap under and into the leg tunnel there is many times little or no room to insert the fastener into the bottom attachment area of the cluster housing.

For example, U.S. Pat. No. 5,959,844 issued Sep. 28, 1999 to Simon et al teaches a method of attaching a circuit board to the vehicle cluster housing.

U.S. Pat. No. 5,997,161 issued Dec. 7, 1999 to Stringfellow et al teaches a vehicle instrument cluster with a black light emitting assembly.

U.S. patent application Publication No. 2003/0079316 published May 1, 2003 to Ogawa teaches a detachable clip for attaching a vehicle cluster member to the vehicle cluster housing.

It would be desirable to eliminate the need to access the bottom cluster housing attachment area with tools and separate fasteners. It would also be desirable to incorporate the cluster attachment into the cluster housing and the IP retainer to reduce both cost and the number of parts required.

DISCLOSURE OF THE INVENTION

The present invention provides advantages and alternatives over the prior art by providing a means of a snap-in roll-up device for mounting the lower edge of a cluster housing without the need for installing traditional fasteners on said lower edge and without the necessity of providing hand and driver access to mount such fasteners.

According to a further aspect of the present invention, there is provided a snap-in cluster attachment for attaching the lower edge of a cluster housing to an IP retainer comprising: at least one attachment member fixedly attached to the lower edge of the cluster housing, said attachment member comprising a body having two ends and two sides wherein one end is attached to the lower edge of the cluster housing and the other end terminates in a mounting pin oriented perpendicular to the sides of the attachment member; and at least one corresponding opening in the IP retainer having mounting pin retaining members disposed therein for receiving and holding the mounting pin of the at least one attachment member; thereby providing for attaching the cluster housing lower edge to the IP retainer by snapping the at least one mounting pin on the lower edge of the cluster housing into place in the corresponding at least one IP retainer opening having mounting pin retaining members located therein.

According to yet another aspect of the present invention there is provided a snap-in cluster attachment for attaching the lower edge of an instrument cluster housing to an IP retainer comprising at least one attachment member fixedly attached to the lower edge of the instrument cluster housing, said attachment member comprising a body having two ends and two sides wherein one end is attached to the lower edge of the instrument cluster housing and the other end terminates in a mounting pin oriented perpendicular to the sides of the attachment member; and at least one corresponding opening in the IP retainer having mounting pin retaining members disposed therein for receiving and holding the mounting pin of the at least one attachment member; thereby providing for attaching the instrument cluster housing lower edge to the IP retainer by snapping the at least one mounting pin on the lower edge of the instrument cluster housing into place in the corresponding at least one IP retainer opening having mounting pin retaining members located therein.

The present invention thus advantageously provides a means of easily mounting a cluster module, particularly an instrument cluster, to an IP retainer and also provides for an easy means of accessing the rear of the cluster housing for service.

BRIEF DESCRIPTION OF DRAWINGS

FIG. 1 shows a front perspective view of the present invention for use with an instrument cluster housing.

FIG. 2 shows a side plan view of the present invention mounting an instrument cluster to an IP retainer.

DETAILED DESCRIPTION

Reference will now be made to the drawings, wherein to the extent possible like reference numerals are utilized to designate like components throughout the various views. Referring to FIG. 1, which presents a perspective view of an instrument cluster housing 1 adaptable for mounting various vehicle instruments having attached thereto a plurality of male snap-in attachment members 10. Each male snap-in attachment member comprises a body 2 having two sides and two ends, one end attached to bottom portion of the instrument cluster housing 1, and the other end terminating in a mounting pin 3 extending a desired distance past each side of said body 2. Also shown is a partial perspective portion of an IP retainer 20 having molded therein complimentary openings 4 having located around the periphery thereof at least two mounting pin retaining members 5 each having a pin mounting surface, and at least one mounting pin retaining member 6 positioned between said at least two mounting pin retaining members 5 and orientated to have its pin mounting surface facing the pin mounting surfaces of said at least two mounting pin retaining members 5.

Referring now to FIG. 2, there is shown a cross section end view of an IP retainer 20 having an instrument cluster housing 1 mounted thereto using the snap-in attachment members 10 of the present invention. The snap-in attachment member 10 having a body 2 attached at one end to the instrument cluster housing 1 and the other end of the body 2 terminating in mounting pins 3 shown here mounted between mounting pin retaining members 5 and 6. Also shown is a typical fastener mounting member 7 on the upper or top portion of the instrument cluster housing 1 for fixedly attaching said instrument cluster housing 1 to said IP retainer 20.

In practice the openings 4 and the mounting pin retaining members 5 and 6 are molded into the IP retainer during the manufacture of said IP retainer using techniques and procedures well known in the IP retainer molding arts.

The snap-in attachment members 10 may be manufactured as separate units and later attached to instrument cluster housing and other IP retainer mounted cluster housings using any known attachment system well known in the art. The presently preferred method of producing the snap-in attachment members 10 of the present invention is to mold them as an integral part of the instrument cluster housing 1 or other cluster housing for mounting on an IP retainer.

The present invention therefore allows mounting of instrument cluster housing and other cluster housings onto an IP retainer where there inadequate access for manual fastening of the lower edge of the housing using traditional fasteners and fastener drivers. The present invention also allows for accessing the rear of the cluster housing and the rear of the instruments mounted therein for servicing or replacement without the difficulty of removing lower edge fastening means from areas having little or no hand and fastener driver access.

Any material well known in the art may be utilized for manufacturing the cluster housings, IP retainer, mounting attachment members, and mounting pin retaining members. The presently preferred material manufacturing the cluster housings is styrene. The presently preferred materials for manufacturing the IP retainer, mounting attachment members and mounting pin retaining members are acrylonitrile butadiene styrene (ABS), polycarbonate acrylonitrile butadiene styrene (PC/ABS), Norel, polypropylene, and other engineered materials.

The dimensions of the various parts may be any desired dimensions suitable for the particular use as is well known in the art. Presently preferred diameters for the mounting pins is from about 2.0 mm to about 10.0 mm, most preferably about 5.0 mm. Currently the preferred wall thickness of the mounting pin retaining members is from about 1.0 mm to about 5.0 mm, most preferably 3.0 mm.

While the preferred embodiment of the present invention has been illustrated having two mounting pin retaining members 5 and one mounting pin retaining member 6 it is to be understood that the number and placement of mounting pin retaining members 5 and 6 may be altered to suit the desired application. Likewise the number of snap-in attachment members 10 may be more or less than illustrated here depending on the particular cluster housing to be mounted while still being within the scope of the claimed invention.

Although the preferred embodiments of the present invention has been disclosed, various changes and modifications may be made without departing from the scope of the invention as set forth in the appended claims.

What is claimed is:

1. A snap-in cluster attachment for attaching the lower edge of a cluster housing to, and aligning said cluster housing within, an IP retainer, and allowing connections to the rear of the cluster housing before final positioning and attachment within said IP retainer without requiring IP retainer guide channels and corresponding cluster guides, by snapping the at least one mounting pin on the lower edge of the cluster housing into place in the corresponding at least one IP retainer opening having mounting pin retaining members located therein comprising:

a) at least one attachment member fixedly attached to the lower edge of the cluster housing, said attachment member comprising a body having two ends and two sides wherein one end is attached to the lower edge of the cluster housing and the other end terminates in a mounting pin oriented perpendicular to the sides of the attachment member; and b) at least one corresponding opening in the IP retainer having mounting pin retaining members, at least one of said retaining members being positioned in opposition to the rest of said retaining members disposed therein for receiving, aligning, and holding the mounting pin of the at least one attachment member.

2. The snap-in cluster attachment as claimed in claim 1, wherein said snap-in cluster attachments allow the cluster housing to be rolled upward for fixedly attaching the cluster housing by its top edge to the IP retainer.

3. The snap-in cluster attachment as claimed in claim 1, wherein said at least one attachment member and at least one corresponding opening comprises 2 or more attachment members and 2 or more corresponding openings.

4. The snap-in cluster attachment as claimed in claim 1, wherein said attachment members are molded as an integral part of the cluster housing.

5. The snap-in cluster attachment as claimed in claim 1, wherein said openings in the IP retainer having mounting pin retaining members disposed therein are molded as an integral part of said IP retainer.

6. The snap-in cluster attachment as claimed in claim 1, wherein said mounting pin has a diameter of from about 2.0 mm to about 10.0 mm, preferably about 5.0 mm.

7. The snap-in cluster attachment as claimed in claim 1, wherein said mounting pin retaining members have a wall thickness of from about 1.0 mm to about 5.0 mm, preferably 3.0 mm.

8. The snap-in cluster attachment as claimed in claim 1, wherein said cluster housing and said attachment member are composed of styrene.

9. The snap-in cluster attachment as claimed in claim 1, wherein said IP retainer and said mounting pin retaining members consist essentially of a material selected from the group acrylonitrile butadiene styrene (ABS), polycarbonate acrylonitrile butadiene styrene (PC/ABS), Norel, polypropylene, and other engineered materials.

10. A snap-in cluster attachment for attaching the lower edge of an instrument cluster housing to, and aligning said cluster housing within, an IP retainer, and allowing connections to the rear of the cluster housing before final positioning and attachment within said IP retainer without requiring IP retainer guide channels and corresponding cluster guides, by snapping the at least one mounting pin on the lower edge of the cluster housing into place in the corresponding at least one IP retainer opening having mounting pin retaining members located therein comprising:

a) at least one attachment member fixedly attached to the lower edge of the instrument cluster housing, said attachment member comprising a body having two ends and two sides wherein one end is attached to the lower edge of the instrument cluster housing and the other end terminates in a mounting pin oriented perpendicular to the sides of the attachment member, and b) at least one corresponding opening in the IP retainer having mounting pin retaining members, at least one of said retaining members being positioned in opposition to the rest of said retaining members disposed therein for receiving, aligning, and holding the mounting pin of the at least one attachment member.

11. The snap-in instrument cluster attachment as claimed in claim 10, wherein said snap-in cluster attachments allow the instrument cluster housing to be rolled upward for fixedly attaching the cluster housing by its top edge to the IP retainer.

12. The snap-in instrument cluster attachment as claimed in claim 10, wherein said at least one attachment member and at least one corresponding opening comprises 2 or more attachment members and 2 or more corresponding openings.

13. The snap-in instrument cluster attachment as claimed in claim 10, wherein said attachment members are molded as an integral part of the instrument cluster housing.

14. The snap-in instrument cluster attachment as claimed in claim 10, wherein said openings in the IP retainer having mounting pin retaining members dispose therein are molded as an integral part of said IP retainer.

15. The snap-in cluster attachment as claimed in claim 10, wherein said mounting pin has a diameter of from about 2.0 mm to about 10.0 mm, preferably about 5.0 mm.

16. The snap-in cluster attachment as claimed in claim 10, wherein said mounting pin retaining members have a wall thickness of from about 1.0 mm to about 5.0 mm, preferably 3.0 mm.

17. The snap-in cluster attachment as claimed in claim 10, wherein said cluster housing and said attachment member are composed of styrene.

18. The snap-in cluster attachment as claimed in claim 10, wherein said IP retainer and said mounting pin retaining members consist essentially of a material selected from the group acrylonitrile butadiene styrene (ABS), polycarbonate acrylonitrile butadiene styrene (PC/ABS), Norel, polypropylene, and other engineered materials.

* * * * *